US 9,286,591 B2

(12) United States Patent
Lehner et al.

(10) Patent No.: US 9,286,591 B2
(45) Date of Patent: Mar. 15, 2016

(54) SYSTEM AND METHOD FOR SHIPPING, DELIVERY, MANIFESTING, AND RETURNS (71) Applicant: Shiptrack.US, LLC, Irondale, AL (US)

(72) Inventors: Shawn Lehner, Tualatin, OR (US); Marvin Windham, Birmingham, AL (US)

(73) Assignee: Shiptrack.US, LLC, Irondale, AL (US)

( * ) Notice: Subject to any disclaimer, the term of this patent is extended or adjusted under 35 U.S.C. 154(b) by 47 days.

(21) Appl. No.: 14/447,966

(22) Filed: Jul. 31, 2014

(65) Prior Publication Data

US 2016/0034850 A1 Feb. 4, 2016

(51) Int. Cl.
*G06Q 10/08* (2012.01)
*H04L 29/06* (2006.01)

(52) U.S. Cl.
CPC ............ *G06Q 10/0837* (2013.01); *G06Q 10/08* (2013.01); *H04L 63/105* (2013.01)

(58) Field of Classification Search
CPC ................. G06F 21/00; G06Q 10/08
USPC ........................................ 235/375, 382, 382.5
See application file for complete search history.

(56) References Cited

U.S. PATENT DOCUMENTS

2013/0346336 A1* 12/2013 Murphy ............. G06Q 10/0833
705/333

* cited by examiner

*Primary Examiner* — Christle I Marshall
(74) *Attorney, Agent, or Firm* — Adams IP, LLC; J. Hunter Adams (57) ABSTRACT

A preferred embodiment of a version of the invention is directed to a system that streamlines and manages the process of managing shipments, deliveries, returns, customers and manifesting. A preferred implementation comprises a system that is based on user's being grouped with specific customers and each specific customer's information being grouped separately from other customers in the system. Preferably, the system comprises permission levels for granting user's access to specific customer information. Permission levels may grant users access to customer specific or system wide information. A preferred implementation further comprises a system for creating manifests and a mobile manifest application.

22 Claims, 7 Drawing Sheets

SYSTEM AND METHOD FOR SHIPPING, DELIVERY, MANIFESTING, AND RETURNS

FIELD OF THE INVENTION

A preferred implementation of a version of the invention refers to a system and method for managing shipping, delivering, customers, manifesting, and returns of items. A preferred embodiment of the system and method is directed to automotive parts.

BACKGROUND

Shipment management and manifesting systems have been used to handle product shipments and returns. Generally, current shipment management and manifesting systems store shipment information in a system, provide limited tracking capability, and limited delivery confirmation capability. Other systems are capable of creating a manifest based on specific deliveries in a driver's route. Other systems are based on creating a tracking number or system for a package.

One problem is that multiple systems must be utilized for a company to effectively manage shipping, returns, tracking, and manifesting on a local level. Many systems provide limited information to the sender and receiver, and do not allow for customized instructions, shipments, and manifests. Additionally, current shipment management and manifesting systems do not allow multiple customers to utilize the same system in order to streamline the manifesting, shipping, and returns processing. Similarly, current shipment management and manifesting systems do not allow multiple customers to create a joint manifest on a local level. Furthermore, currently available systems and methods generally do not allow for customer specific manifesting options and preferences.

Accordingly, there is a need for a single system capable of helping clients manage labeling, manifesting, shipping, delivering, and returns. Additionally, there is a need for a system capable of allowing several clients to create joint manifests, with each client handling its own shipment and return information.

SUMMARY

In accordance with one aspect of the principles of the invention, a system and method for managing shipping, delivery, customers, manifesting, and returns of items are provided. The system may comprise multiple clients and servers. At least one of the clients or servers is configured to allow a user to be associated with a customer and manage shipping, delivery, customers, manifesting, and returns.

According to another aspect, a system for providing customer information to a user based on permission levels is provided. The system may comprise a processor for determining a user's permission level for accessing and manipulating certain stored customer information and actions. One implementation of the invention comprises system wide and customer specific permission levels for controlling the level of access a user has to information stored on a database.

According to yet another aspect, a system and method for manifesting is provided. In one implementation, users with certain permission levels may create manifests for deliveries and returns. The system may include a mobile application in which a delivery driver may access a manifest from his mobile device. In yet another implementation a driver may communicate with a user having certain permission levels in real time through the system. The system further comprises a method of manifesting shipments and returns, managing delivery drivers, and overseeing delivery driver activity.

Additional features and advantages of the invention will be set forth in the description which follows, and will be apparent from the description, or may be learned by practice of the invention. The foregoing general description and the following detailed description are exemplary and explanatory and are intended to provide further explanation of the invention.

DESCRIPTION OF THE DRAWINGS

These and other features, aspects, and advantages of the present invention will become better understood with regard to the following description, appended claims, and accompanying drawings where:

DETAILED DESCRIPTION

In the Summary above and in this Detailed Description, and the claims below, and in the accompanying drawings, reference is made to particular features, including method steps, of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with/or in the context of other particular aspects of the embodiments of the invention, and in the invention generally.

The term "comprises" and grammatical equivalents thereof are used herein to mean that other components, steps, etc. are optionally present. For example, a system "comprising" components A, B, and C can contain only components A, B, and C, or can contain not only components A, B, and C, but also one or more other components.

The terms "customer actions and data" are used herein to mean any actions and information relating to a customer's orders, tracking, shipping, delivery, returns, and manifesting. For example, storing a "customer's actions and data" in a database can may refer to storing any information relating customer's shipping information, or a receiving party's information. As set forth herein, the actions and data may be supplied from text fields, or tags, as disclosed herein.

The terms "customer identification information" and "user identification information" are used herein to mean any identification information relating to a customer or user, respectively. For example, this information may include addressees, phone number, specified users of a customer, and other similar identification information. Further, customer identification information and user identification information may further comprise any form of identification that may be used to verify the identification of a customer or a user. Customer identification and/or user identification information may comprise login credentials, device recognition, or any other method for verifying one's identity.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

Systems and methods consistent with the principles of the invention may provide solutions for managing shipping and delivery, customers, manifesting, and returns, and provide extensive reporting capability. For example, the systems and methods may permit users to ship, deliver, manifest and track automotive parts. The systems and methods may allow for various functionality related to said shipments, deliveries, and manifests.

Figure 1:
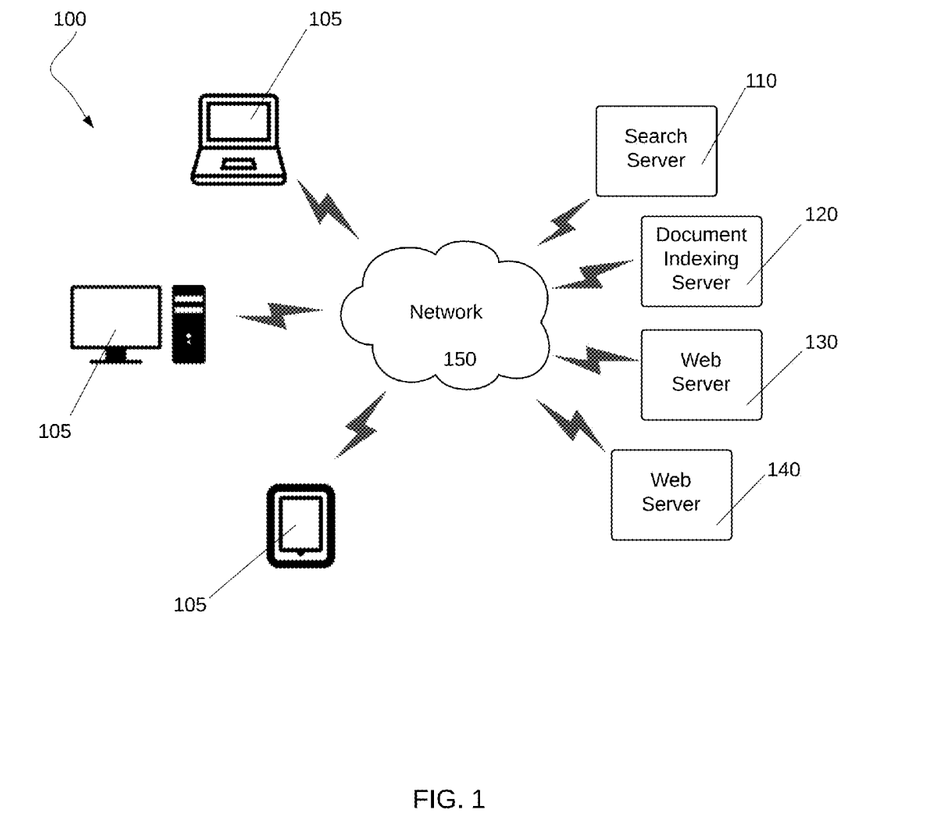
FIG. 1 is a diagram of an example environment in which techniques described herein may be implemented.

FIG. 1 is a diagram of an example environment 100 in which techniques described herein may be implemented. Environment 100 may include multiple clients 105 connected to one or more servers 110-140 via a network 150. In some implementations, and as illustrated, server 110 may be a search server, that may implement a search engine; and server 120 may be a document indexing server, e.g, a web crawler; and servers 130 and 140 may be general web servers, such as servers that provide content to clients 105. Clients 105 and servers 110-140 may be connected to network 150 via wired, wireless, or a combination of wired and wireless connections.

Three clients 105 and four servers 110-140 are illustrated as connected to network 150 for simplicity. In practice, there may be additional or fewer clients and servers. Also, in some instances, a client may perform the functions of a server and a server may perform the functions of a client.

Clients 105 may include devices of users that access servers 110-140. A client 105 may include, for instance, a personal computer, a wireless telephone, a personal digital assistant (PDA), a laptop, a smart phone, a tablet computer, or another type of computation or communication device. Servers 110-140 may include devices that access, fetch, aggregate, process, search, provide, and/or maintain documents. Although shown as single components 110, 120, 130, and 140 in FIG. 1, each server 110-140 may, in some implementations, be implemented as multiple computing devices, which potentially may be geographically distributed.

Search server 110 may include one or more computing devices designed to implement a search engine, such as a documents/records search engine, general webpage search engine, etc. Search server 110 may, for example, include one or more web servers to receive search queries and/or inputs from clients 105, search one or more databases in response to the search queries and/or inputs, and provide documents or information, relevant to the search queries and/or inputs, to clients 105. In some implementations, search server 110 may include a web search server that may provide webpages to clients 105, where a provided webpage may include a reference to a web server, such as one of web servers 130 or 140, at which the desired information and/or links is located. The references, to the web server at which the desired information is located, may be included in a frame and/or text box, or as a link to the desired information/document.

Document indexing server 120 may include one or more computing devices designed to index documents available through network 150. Document indexing server 120 may access other servers, such as web servers that host content, to index the content. In some implementations, document indexing server 120 may index documents/records stored by other servers, such as web servers 130 and 140 and, connected to network 150. Document indexing server 120 may, for example, store and index content, information, and documents relating to customer shipments, deliveries, and returns.

Web servers 130 and 140 may each include web servers that provide webpages to clients. The webpages may be, for example, HTML-based webpages. A web server 130/140 may host one or more websites. A website, as the term is used herein, may refer to a collection of related webpages. Frequently, a website may be associated with a single domain name, although some websites may potentially encompass more than one domain name. The concepts described herein may be applied on a per-website basis. Alternatively, in some implementations, the concepts described herein may be applied on a per-webpage basis.

While servers 110-140 are shown as separate entities, it may be possible for one or more servers 110-140 to perform one or more of the functions of another one or more of servers 110-140. For example, it may be possible that two or more of servers 110-140 are implemented as a single server. It may also be possible for one of servers 110-140 to be implemented as multiple, possibly distributed, computing devices.

Network 150 may include one or more networks of any kind, including, but not limited to, a local area network (LAN), a wide area network (WAN), a telephone network, such as the Public Switched Telephone Network (PTSN), an intranet, the Internet, a memory device, another type of network, or a combination of networks.

Although FIG. 1 shows example components of environment 100, in other implementations, environment 100 may contain fewer components, different components, differently arranged components, and/or additional components than those depicted in FIG. 1. Alternatively, or additionally, one or more components of environment 100 may perform one or more other tasks described as being performed by one or more other components of environment 100.

Figure 2:
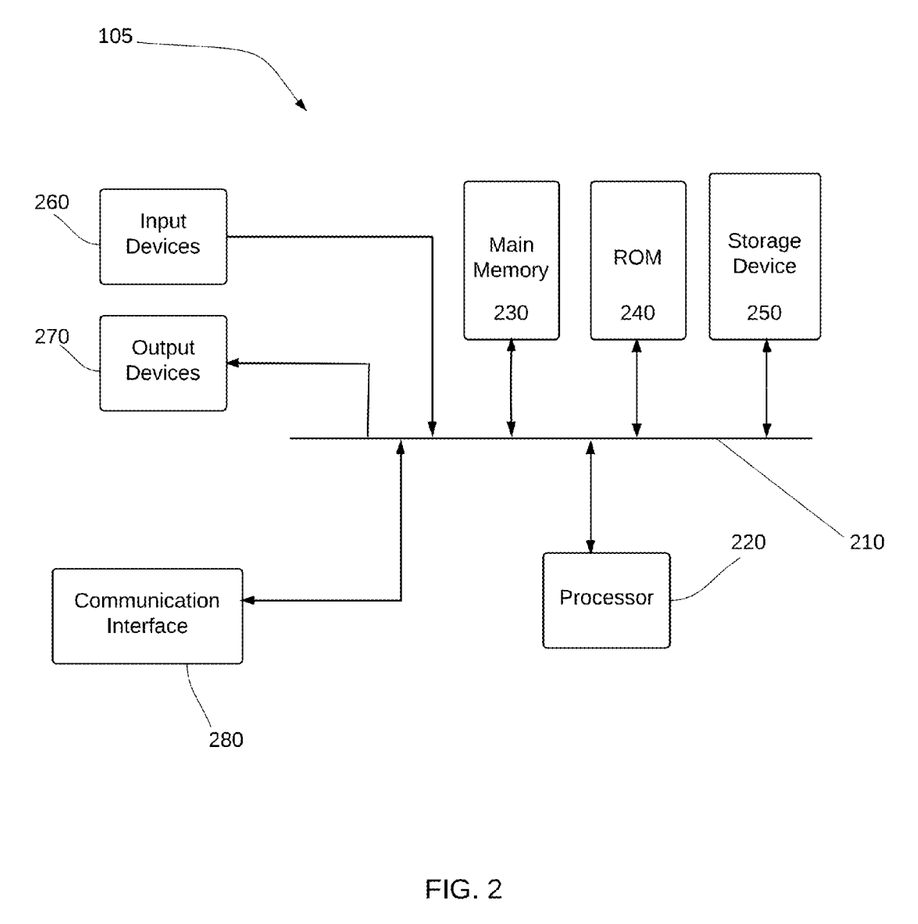
FIG. 2 is an exemplary diagram of a client of FIG. 1 according to an implementation consistent with the principles of the invention.

FIG. 2 is an exemplary diagram of a user/client 105 or server entity (hereinafter called "client/server entity"), which may correspond to one or more of the clients and servers, according to an implementation consistent with the principles of the invention. The client/server entity 105 may include a bus 210, a processor 220, a main memory 230, a read only memory (ROM) 240, a storage device 250, one or more input devices 260, one or more output devices 270, and a communication interface 280. Bus 210 may include one or more conductors that permit communication among the components of the client/server entity 105.

Processor 220 may include any type of conventional processor or microprocessor that interprets and executes instructions. Main memory 230 may include a random access memory (RAM) or another type of dynamic storage device that stores information and instructions for execution by processor 220. ROM 240 may include a conventional ROM device or another type of static storage device that stores static information and instructions for use by processor 220. Storage device 250 may include a magnetic and/or optical recording medium and its corresponding drive.

Input device(s) 260 may include one or more conventional mechanisms that permit an operator to input information to the client/server entity 105, such as a keyboard, a mouse, a pen, voice recognition and/or biometric mechanisms, etc. Output device(s) 270 may include one or more conventional mechanisms that output information to the operator, including a display, a printer, a speaker, etc. Communication interface 280 may include any transceiver-like mechanism that enables the client/server entity 105 to communicate with other devices 105 and/or systems. For example, communication interface 280 may include mechanisms for communicating with another device 105 or system via a network, such as network 150.

As will be described in detail below, the client/server entity 105, consistent with the principles of the invention, performs certain search, recording, and tracking operations. The client/server entity 105 may perform these operations in response to processor 220 executing software instructions contained in a computer-readable medium, such as memory 230. A computer-readable medium may be defined as one or more physical or logical memory devices and/or carrier waves.

The software instructions may be read into memory 230 from another computer-readable medium, such as data storage device 250, or from another device via communication interface 280. The software instructions contained in memory 230 causes processor 220 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Figure 3:
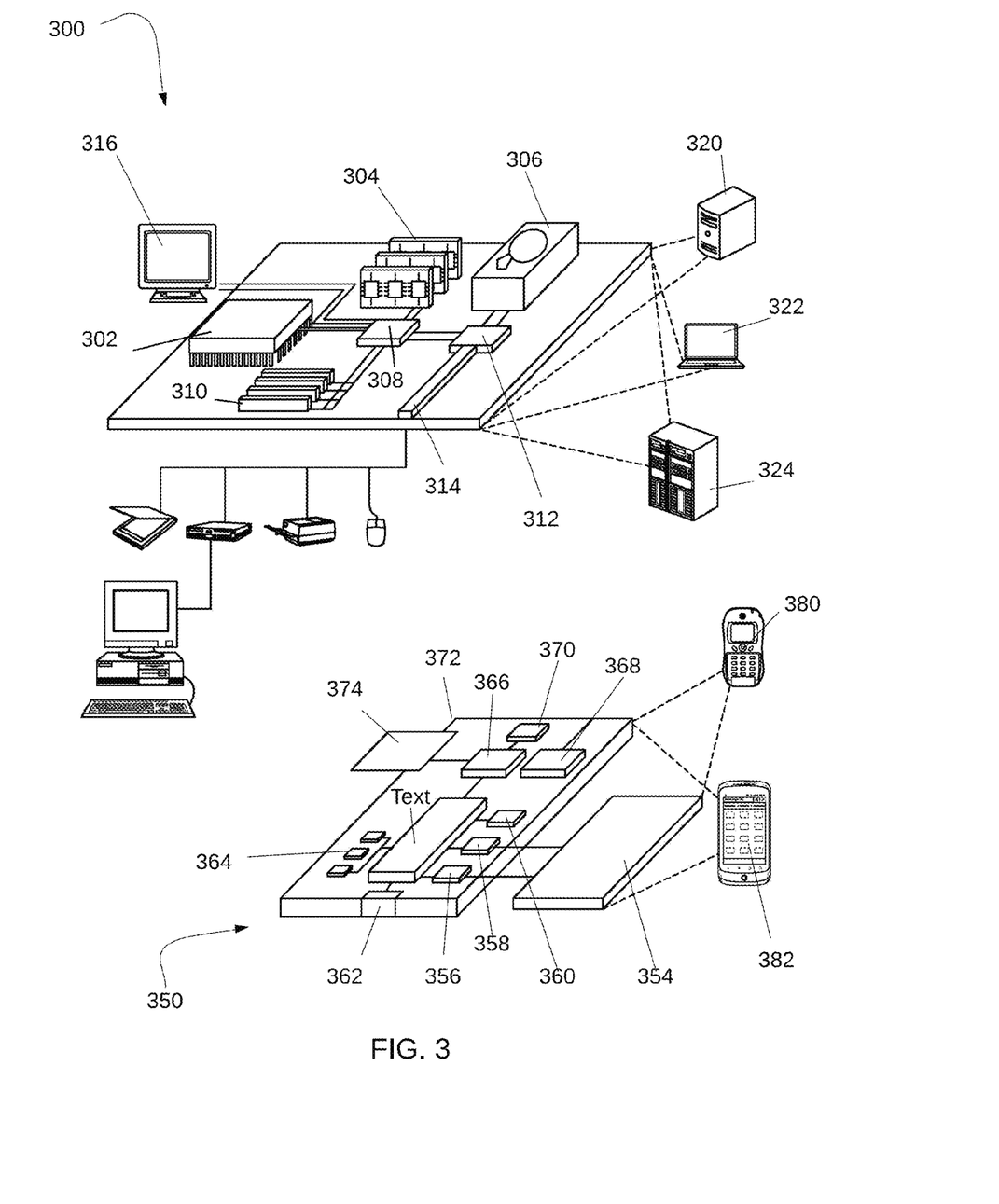
FIG. 3 is a diagram of an example of a generic computing device and a generic mobile computing device.

FIG. 3 is a diagram of an example of a generic computing device 300 and a generic mobile computing device 350, which may be used with the techniques described here. Generic computing device 300 or generic mobile computing device 350 may correspond to, for example, a client 105 and or a server 110-140. Computing device 300 is intended to represent various forms of digital computers, such as laptops, desktops, workstations, personal digital assistants, servers, mainframes, and other appropriate computers. Mobile computing device 350 is intended to represent various forms of mobile devices, such as personal digital assistants, cellular telephones, smart phones, tablet computers, and other similar computing devices. The components show in FIG. 3, their connections and relationships, and their functions, are meant to be examples only, and are not meant to limit implementations described herein.

Computing device 300 may include a processor 302, a memory 304, a storage device 306, a high-speed interface 308 connecting to a memory 304 and high-speed expansion ports 310, and a low-speed interface 312 connecting to a low-speed expansion port 314 and a storage device 306. Each of components 302, 304, 306, 308, 310, 312, and 314 are interconnected using various buses, and may be mounted on a common motherboard or in other manners as appropriate. Processor 302 can process instructions for execution within computing device 300, including instructions stored in memory 304 or on storage device 306 to display graphical information for a graphical user interface (GUI) on an external input/output device, such as display 316 coupled to high-speed interface 308. In other implementations, multiple processors and/or multiple buses may be used, as appropriate, along with multiple memories and types of memory. Also, multiple computing devices 300 may be connected, with each device providing portions of the necessary operations, as a server bank, a group of blade servers, or a multi-processor system, etc.

Memory 304 stores information within computing device 300. In some implementations, memory 304 includes a volatile memory unit or units. In another implementation, memory 304 may include a non-volatile memory unit or units. Memory 304 may also be another form of computer-readable medium, such as a magnetic or optical disk. A computer-readable medium may refer to a non-transitory memory device. A memory device may refer to storage space within a single storage device or spread across multiple storage devices.

Storage device 306 is capable of providing mass storage for computing device 300. In some implementations, storage device 306 may be or contain a computer-readable medium, such as a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described herein. The information carrier is a computer or machine-readable medium, such as memory 304, storage device 306, or a memory on processor 302.

High-speed interface 308 manages bandwidth-intensive operations for computing device 300, while low-speed interface 312 manages lower bandwidth-intensive operations. Such allocation of functions is an example only. In some implementations, high-speed interface 308 is coupled to memory 304, display 316, such as through a graphics processor or accelerator, and to high-speed expansion ports 310, which may accept various expansion cards. In this implementation, low-speed interface 312 may be coupled to storage device 306 and low-speed expansion port 314. Low-speed expansion port 314, which may include various communication ports, such as USB, Bluetooth, Ethernet, wireless Ethernet, etc., may be coupled to one or more input/output devices, such as a keyboard, a pointing device, a scanner, or a networking device such as switch or router, e.g., through a network adapter.

Computing device 300 may be implemented in a number of different forms, as shown in the figures. For example, computing device 300 may be implemented as a standard server 320, or in a group of such servers. Computing device 300 may also be implemented as part of a rack server system 324. In addition, computing device 300 may be implemented in a personal computer, such as a laptop computer 322. Alternatively, components from computing device 300 may be combined with other components in a mobile device, such as mobile computing device 350. Each of such devices may contain one or more computing devices 300, 350, and an entire system may be made up of multiple computing devices 300, 350 communicating with each other.

Mobile computing device 350 may include a processor 352, a memory 364, an input/output ("I/O") device, such as a display 354, a communication interface 366, and a transceiver 368, among other components. Mobile computing device 350 may also be provided with a storage device, such as a microdrive or other device, to provide additional storage. Each of the components 352, 364, 354, 366, and 368 are interconnected using various buses, and several of the components may be mounted on a common motherboard or in other manners as appropriate.

Processor 352 can execute instructions within mobile computing device 350, including instructions stored in memory 364. Processor 352 may be implemented as a chipset of chips that include separate and multiple analog and digital processors. Processor 352 may provide, for example, for coordination of the other components of mobile computing device 350, such as control of user interfaces, applications run by mobile computing device 350, and wireless communication by mobile computing device 350.

Processor 352 may communicate with a user through control interface 358 and display interface 356 coupled to a display 354. Display 354 may be, for example, a TFT LCD (Thin-Film-Transistor Liquid Crystal Display) or an OLED (Organic Light Emitting Diode) display or other appropriate display technology. Display interface 356 may include appropriate circuitry for driving display 354 to present graphical and other information to a user. Control interface 358 may receive commands from a user and convert the commands for submission to processor 352. In addition, an external interface 362 may be provided in communication with processor 352, so as to enable near area communication of mobile computing device 350 with other devices. External interface 362 may provide, for example, for wired communications in some implementations, or for wireless communication in other implementations, and multiple interfaces may also be used.

Memory 364 stores information within mobile computing device 350. Memory 364 can be implemented as one or more of a computer-readable medium or media, a volatile memory unit or units, or a non-volatile memory unit or units. Expansion memory 374 may also be provided and connected to mobile computing device 350 through expansion interface 372, which may include, for example, a SIMM (Single In Line Memory Module) card interface. Such expansion memory 374 may provide extra storage space for device 350, or may also store applications or other information for mobile computing device 350. Specifically, expansion memory 374 may include instructions to carry out or supplement the processes described herein, and may include secure information also. Thus, for example, expansion memory 374 may be provided as a security module for mobile computing device 350, and may be programmed with instructions that permit secure use of mobile computing device 350. In addition, secure applications may be provided via the SIMM cards, along with additional information, such as placing identifying information on the SIMM card in a non-hackable manner.

Expansion memory 374 may include, for example, flash memory and/or NVRAM memory. In some implementations, a computer program product is tangibly embodied in an information carrier. The computer program product contains instructions that, when executed, perform one or more methods, such as those described herein. The information carrier is a computer- or machine readable-medium, such as memory 364, expansion memory 374, or a memory on processor 352, that may be received, for example, over transceiver 368 or external interface 362.

Mobile computing device 350 may communicate wirelessly through communication interface 366, which may include digital signal processing circuitry where necessary. Communication interface 366 may provide for communications under various modes or protocols, such as GSM voice calls, SMS, EMS or MMS messaging, CDMA, TDMA, PDC, WCDMA, CDMA2000, or GPRS, among others. Such communication may occur, for example, through transceiver 368. In addition, short-range communication may occur, such as using a Bluetooth, WiFi, or other such transceiver. In addition, GPS (Global Positioning System) received module 370 may provide additional navigation- and location-related wireless data to mobile computing device 350, which may be used as appropriate by applications running on mobile computing device 350.

Mobile computing device 350 may also communicate audibly using audio codec 360, which may receive spoken information from a user and covert the received spoken information to digital information. Audio codec 360 may likewise generate audible sound for a user, such as through a speaker, e.g., in a handset of mobile computing device 350. Such sound may include sound from voice telephone calls, may include recorded sound, such as voice messages, music files, etc., and may also include sound generated by applications operating on mobile computing device 350.

Mobile computing device 350 may be implemented in a number of different forms, as shown in the figure. For example, mobile computing device 350 may be implemented as a cellular telephone 380. Mobile computing device 350 may also be implemented as part of a smart phone 382, personal digital assistant, or other similar mobile device.

Various implementations described herein can be realized in digital electronic circuitry, integrated circuitry, specially designed ASICs (application specific integrated circuits), computer hardware, firmware, software, and/or combinations thereof. These various implementations can include implementations in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, also known as programs, software, software applications, or code, include machine instructions for a programmable processor, and can be implemented in a high-level procedural and/or object-oriented programming language, and/or in assembly/machine language. As used herein, the terms "machine-readable medium" and "computer-readable medium" refer to any apparatus and/or device, such as magnetic discs, optical disks, memory, Programmable Logic Devices ("PLDs"), used to provide machine instructions and/or data to a programmable processor, including a machine-readable medium that receives machine instructions as a machine-readable signal. The term "machine-readable signal" refers to any signal used to provide machine instructions and/or data to a programmable processor.

The contents of computer-readable medium may physically reside in one or more memory devices accessible by server. Computer-readable medium may include a database of entries corresponding to shipping, returns, tracking, manifesting, and customer management. Each of the entries may include, but are not limited to, shipping customer, receiving customer, quantity, quantity type, reference number, type, tag, flags, comments, and issue date, and other fields. The information fields store in a database a user or customers's information as set forth herein. Said fields are customizable and may include additional or alternative fields based on the user's needs. Said information is accessible through the server.

To provide for interaction with a user, the techniques described herein can be implemented on a computer having a display device, such as a CRT (cathode ray tube), LCD (liquid crystal display), or LED (Light Emitting Diode) monitor, for displaying information to the user and a keyboard and a pointing device by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input.

The techniques described herein can be implemented in a computing system that includes a back end component, such as a data server, or that includes a middleware component, such as an application server, or that includes a front end component, such as a client computer having a graphical user interface or Web browser through which a user can interact with an implementation of the techniques described here, or any combination of such back end, middleware, or front end components. The components of the system can be interconnected by any form of medium of digital communication.

A preferred implementation of the invention discloses a system and method for managing multiple daily same-route deliveries for small, medium and large organizations or dealers. The invention discloses a complete system for managing shipments. The system comprises a user management system allowing an administrator to group users by individual organizations or dealers (customers) and limit their access to only shipping information for their dealer, or setup system wide users who manage the overall network. The system further comprises a comprehensive shipment management system that tracks all of the information passing through the system and makes it available for later use. The system further comprises return management allowing customers to request returns online while using the historical information in the system to verify the accuracy of the request. The system further comprises reporting tools to export useful analytics from the system in various formats including HTML and Excel.

In a preferred embodiment, the system is written in C# and utilizes Microsoft ASP.NET. However, it is understood that embodiments of the invention disclosed herein may be created from any language using any framework. In one implementation the system comprises a suite of web services that power all of the applications and tools that comprise the system. For example, web-based management tools, as well as the web-based delivery application, both interface with the same set of services.

Figure 4:
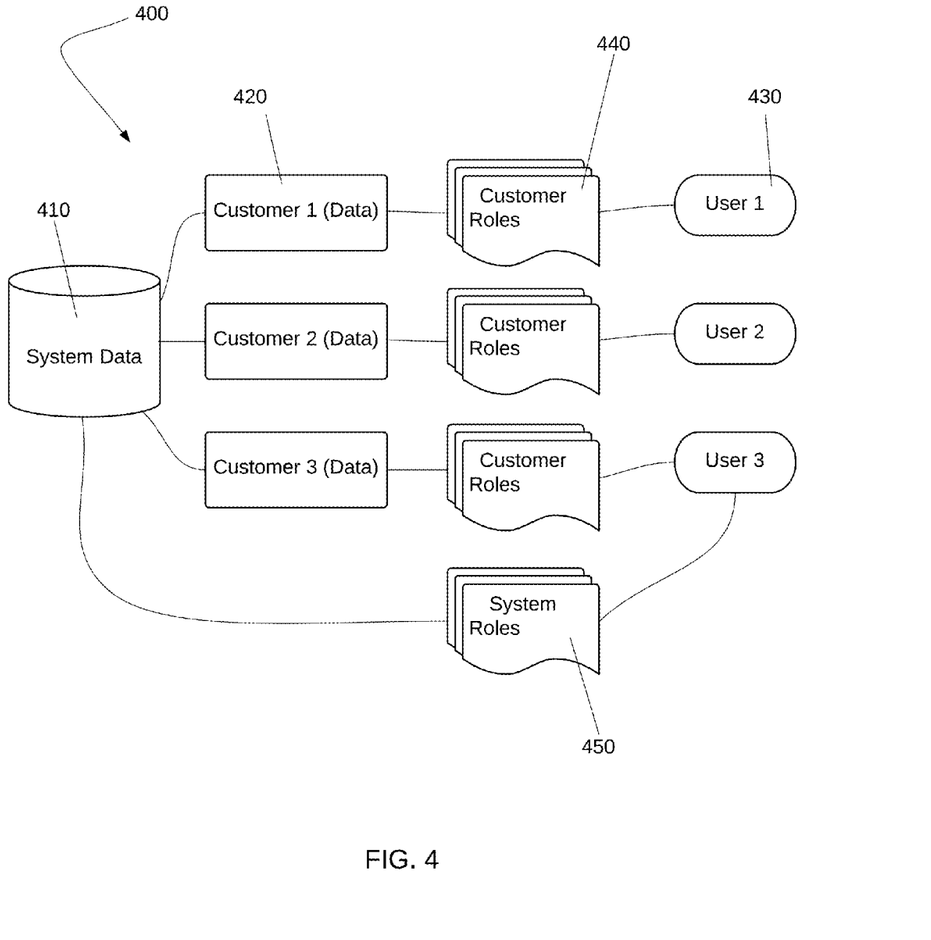
FIG. 4 is a diagram illustrating an example system configuration according to an implementation consistent with the principles of the invention.

As illustrated in FIG. 4, in a preferred embodiment, the system comprises at least one database 410 where all customer actions and data are stored. It is understood that the system may comprise more than one database for storing information. In a preferred embodiment, each customer 420 is unique and must have a unique identification number when each customer 420 is added to the system. Preferably, each customer 420 uses a unique ten digit phone number when each customer account is created. Additionally, a unique identifier may be provided by the system. Additional customer information, such as physical address, may also be stored at the time said customer account is created.

FIG. 4 shows a simple representation of an exemplar architecture of a version of the current invention. In one embodiment the system utilizes a database management system such as Microsoft SQL or similar. It is understood that various servers may be used to access stored data. Users 430 must connect through a service or server before accessing stored data. This ensures all access to the database 410 has been authenticated and restricts users 430 to changes within their permission level, as set forth herein.

In a preferred embodiment, a user 430 uses a web browser to navigate to a system website. The system website comprises a plurality of web pages. In a preferred embodiment, each webpage is accessed via tabs on the system website homepage or other system webpage. Links or tabs allow a user 430 to navigate from one page to another. Implementations of the invention further comprise web-based forms with text fields therein. In a preferred embodiment, said text fields auto populate predetermined forms, webpages, databases, servers, or other targeted destinations. In one embodiment, a user accesses a webpage that accesses a database via a server.

As illustrated in FIG. 4, the overall system comprises at least one system database 410 for storing information. Various customers 420, or organizations, store their information in a system database 410. Each customer's information is accessible only to those users 430 having specific permission to access said information. This is especially advantageous if an administrator has multiple organizations and/or customers 420 that are generating shipments but the administrator needs each customer 420 to mange its own shipment data. Generally, each customer 420 may have one of more users 430.

As further illustrated in FIG. 4, the invention discloses customer 440 and system 450 roles. These roles determine what data each user 430 may access. There are no specific requirements on the number of roles 440/450 assigned to a user 430. A user 430 can exist in the system without a singe role 440/450 assigned to him. Or, a user 430 may have up to one of each role 440/450 in the system assigned to him. The primary Customer roles 440 are manager, shipper, and sales associate. It is understood that additional or alternative roles may be used in the system.

In a preferred implementation, the manager is the highest customer role 440 for a single customer 420. This role allows a user 430 to generate reports, view shipment data, and manage customers. The manager role allows a user 430 to view manifest routing in read-only mode. This allows a manager to track the progress without making changes to the delivery process. Additionally, the manager role allows the user 430 to view and manage customers. A server provides customer 420 specific information from a database 410 based on that user's 430 permission level.

Shippers have the ability to issue shipments and accept returns. The system 400 provides shippers access to the shipping and returns list of their company. The shipper role provides a user 430 the ability to manage shipments from the customer 420 that user 430 is associated with. Additionally, a shipper may view and manage returns for the customer 420 that user 430 is associated with. A server provides customer 420 specific information from a database 410 based on said user's 430 permission level.

Sales associates have the ability to use the sales portion of the customer screen. This allows sales associates to track contacts, schedule callbacks, and make sales related notes for each customer. A sales associate has the ability to view shipments relating to the customer 420 to which it is associated as well as the ability to view customers 420. A server provides customer 420 specific information from a database 410 based on that user's 430 permission level.

Implementations of the system rely on accurate customer information and delivery lists to ensure shipments are delivered on time and to the correct locations. Since this customer information is the same used by many sales forces, customer relationship management (CRM) functionality may be included in the system. The system's management interface may feature a robust suite of CRM tools that can help sales associates stay in touch with customers. In one embodiment, a system interface provides reports on sales activity for the customer. In yet another embodiment the system comprises automatic notices to provide "tips" to sales associates on which customers to follow-up with. Another embodiment allows a user to send bulk emails to customers based on various filters.

In some implementations sales associates are assigned to handle specific customers 420. The system allows them to quickly filter information for only customers 420 they are responsible. In one implementation, said filtered information is provided to a user 430 based on his permission levels. This same functionality simplifies the process for organizations with multiple associates to coordinate their sales force and ensure there is no overlap in communication.

In a preferred embodiment, users 430 with required permission levels may access a system reporting interface. The system reporting interface consolidates customer 440 information and allows a user 430 to filter said information based on specific fields, sales, and other relevant categories. Additionally, users 430 with required permission levels have the ability to add other contact information or notes relating to a specific customer 420. This information is stored in a system database 410.

In a preferred implementation, the primary System roles 450 are super administrator, administrator, dispatcher, and analytics. It is understood that additional or alternative roles may be used in the system 400. The super administrator is the owner of the system 400. There is only one super administrator for system 400. This role cannot be revoked or changed. It allows a single point of contact to have all final decision making for an instance. Super administrators have the ability to manage and add/remove users 430. Additionally, super administrators can add/remove administrator roles from users 430. A server provides customer 420 specific information from a database 410 based on that user's 430 permission level.

Administrators have control over users 430 and system 400 wide configuration options. Administrators are able to add/remove users 430 and add/remove roles 440/450 for users 430. Administrators have the ability to view and manage users 430. Additionally, administrators have the ability to change system 400 configuration options. A server provides customer 420 specific information from a database 410 based on said user's 430 permission level.

Dispatchers have full access to all data in the system 400. They are responsible for managing manifests and drivers. The concept of a manifest is simple—it is a collection of shipments and returns, grouped by customer 420, which can be used by a driver during the delivery process. These manifests are stored in the system 400 electronically but can also be printed and used as a physical manifest if desired.

The dispatcher role provides a user 430 access to view and manage shipments and returns. The dispatcher may have access to view, manage, and reconcile manifests. The dispatcher may view and manage drivers. The dispatcher has the ability to assign manifests to drivers and track delivery progress through a mobile application. The dispatcher role allows a user to view and manage customers 420 and routes. A server provides customer 420 specific information from a database 410 based on that user's 430 permission level.

The analytics role provides a user 430 access to a reports section of a program dashboard. In a preferred embodiment, the reporting section of the dashboard allows a user 430 to generate reports. These reports are based on templates. Preferably a base set of templates is included in all installations of the system. In addition, custom templates may be created if needed for client specific reports. There reports use the information stored in the database 410.

Analytics users 430 are able to build reports for all customers 420 in the system 400. Analytics users 430 have access to a report generation interface. Analytics users 430 have access to view and manage contests. As set forth herein, contests are ways to generate lists based on certain parameters. For example, these parameters can be based on number of sales in a specific time period. These lists are then used to run contests and select winners. A server provides customer 420 specific information from a database 410 based on that user's 430 permission level.

As disclosed herein, shipments are records that track an invoice, or multiple invoices, as well as package information, between a shipping customer 420 and a receiving customer 420. In an implementation of the present invention the shipping and receiving customer 420 are represented simply as "customers" 420 for the system. The primary difference is that the shipping customer 420 also has users 430 who have been allowed to issue shipments within the system via the "shipper" role, as set forth herein.

When a shipment is issued the customer 420 who creates the shipment "owns" it, and it is thus segregated from other customers 420 who are using the system to generate shipments. Thus, specific shipment data is tagged as being a shipment related specifically to the shipping customer 420 and is stored as such in a database 410.

According to a preferred implementation of the invention, a shipment may be created via two methods. First, a user 430 with proper permissions may access the system management interface using an account that has a shipper role. In a preferred implementation, the management interface is accessed via the system webpage. The user 430 then navigates to a "Create Shipment" form to manually create a shipment. In one implementation the "Create Shipment" form is a webpage comprising a web form with text fields. Preferably, a user 430 navigates to the system webpage to access the text fields making up said form. These fields may comprise, but are not limited to shipping customer, receiving customer, quantity, quantity type, reference number, type, tag, flags, comments, and issue date. It is understood that additional or alternative field may be added or used.

The shipping customer field describes the customer 420 who is creating the shipment. This customer 420 is the "owner" of the shipment. The receiving customer field describes the customer 420 that will be receiving the package(s). The quantity field describes the number of packages included in the shipment. The quantity type field describes how the item is going to be shipped. For example, pieces could describe individual boxes where pallet describes multiple boxes on a larger pallet.

The reference number field describes an organization specific tracking code for reference at a later date. The type field describes the type of shipment. This is important because the type of shipment can alert the driver to what he will be doing when he arrives at the stop. For example, a COD shipment would indicate the driver should collect money, whereas a "pickup-order" would tell the driver they are simply collecting a part.

The tag field is used to group shipments in the system. These are used for automatic grouping when creating shipments and can be used to run batches of shipment for each route. For example, one could have both a Next Day and a Same Day tag to split packages between multiple runs. The flag field is used to attach additional informational data to shipments. These flags do not affect how shipments are handled. Instead, they are used more as informative items for the driver as they are printed on the labels for each package.

The comments field allows drivers, shippers, and other system users 430 to attach notes to a shipment. This is a shared notes field that can be edited by anyone during the life of a shipment. The issue date field tracks when the shipment object was added to the system.

Once a shipment record has been created, a user 430 will receive a tracking number and an option to print labels for the shipment. All of this information is grouped together by customer 420 and stored in a database 410.

Second, the system also supports an API to receive shipments from other systems. This functionality allows it to integrate into existing inventory and order processing systems. Businesses may create either an export process or a real-time webhook to send shipments to the system as they are processed. Therefore, there is no need to fully replace an existing system, they can instead be augmented by the features included in the system.

When the system 400 receives a new shipment a new record is stored in the system 400. This record is permanently bound to the customer 420 who created the shipment. Therefore, users 430 with roles giving them access to customer data will only be able to see shipments which they created or were created by users 430 for the same customer 420. This allows for a multi-tenant implementation of the system 400 where multiple customers 420 can coexist on the system 400 with each customer 420 only being able to view and manage its own shipments.

Figure 5:
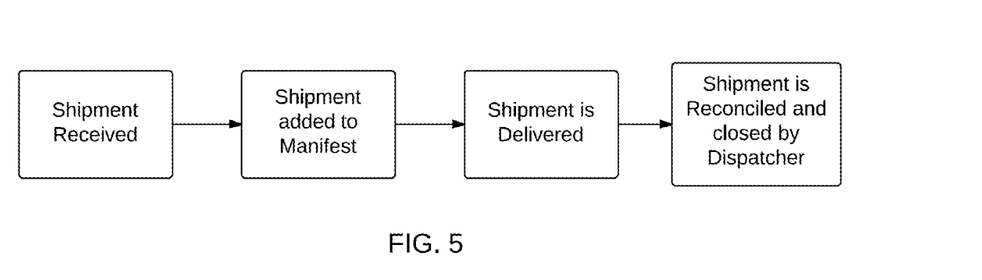
FIG. 5 is a flowchart of exemplary processing for handling a shipment according to an implementation consistent with the principles of the invention.

Shipments added to the system are marked as "Outstanding" to indicate that they have not yet been delivered. Users 430 with access to these shipments can print shipping labels as needed which contain the information required to track the package during delivery; such as route, number of total packages in the shipment, receiving customer 420, shipment type, and other important shipment related notes. Once a shipment has been created dispatchers are able to assign these shipments to a manifest, as further disclosed herein. The typical lifecycle of a shipment is set forth in FIG. 5.

Returns are represented in much the same way as shipments. They are records in the system database 410 that store information about items that need to be received by drivers while servicing their routes. A system user 430 may use an online web form to request these returns. In a preferred implementation, when requesting a return a user 430 is asked to enter the original invoice number for the product. A server checks this information against the shipment records inside the system to find which customer 420 originally shipped the part and where it was originally delivered. This functionality reduces the burden for requesting returns by eliminating the need to fill in the detailed delivery and pickup information. In addition, this logic helps ensure that return items are received and delivered to the correct entities by acting as an audit of the user's 430 request.

According to an implementation of the invention, users 430 may choose to print labels for returns that can be given to drivers to attach once they have received the package. These labels contain information on which customer 420 the package should be returned to, the part number being returned, as well as the number of packages and the related invoices. In a preferred implementation, forms may be printed for returns which are auto-filled with the individual return information and provides the driver with a template to collect information from the customer 420 upon receipt of the package.

Figure 6:
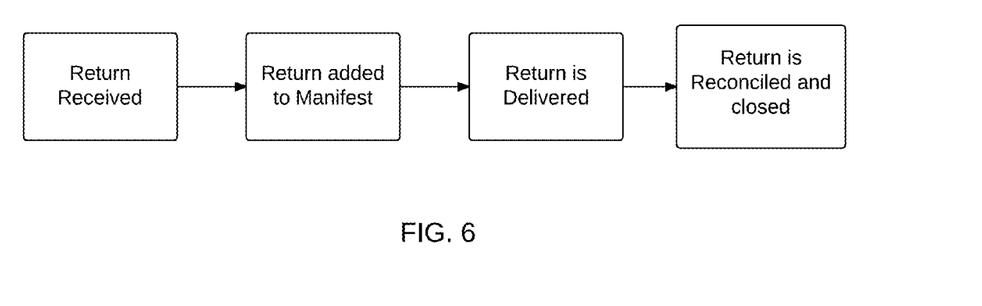
FIG. 6 is a flowchart of exemplary processing for handling a return according to another implementation consistent with the principles of the invention.

Once a return has been added to the system dispatchers may assign it to a manifest. A return will show up on the manifest just like shipments, and will inform the driver servicing the manifest of what to expect to receive while at the stop. Once shipments and returns have been added to the system, manifests can be used to group these items for delivery. The typical lifecycle of a return is set forth in FIG. 6.

In a preferred implementation, there are two methods for creating a manifest. The first option is to create a manifest automatically. This process takes all of the outstanding shipments in a user's 430 selection and creates multiple manifests, grouping items onto the manifest based on customer route and shipment tag. Routes allow customers 420 to be grouped into geographically relevant areas for delivery. As used herein, routes are represented as a simple string field for customers 420 and can be added with ease when new customers 420 are created. These routes are used to manage groups of customers 420 inside the system, and allow for default delivery priorities to be established for the customers 420. Additionally, there are currently available tools and systems that prioritize customers 420 based on route.

The second option is to create custom manifests. This option is very flexible as it allows a dispatcher to assign his own manifest name and select the individual shipments and returns to include or exclude.

In a preferred implementation only a dispatcher or other high-level system wide user can create manifests. Among other reasons, this is due to the fact that shipments from all customers 420 in the system need to be aggregated onto the same manifest. Users 430 with system role 450 permission to access all of the data in the system 400 can only access this scope of data.

Figure 7:
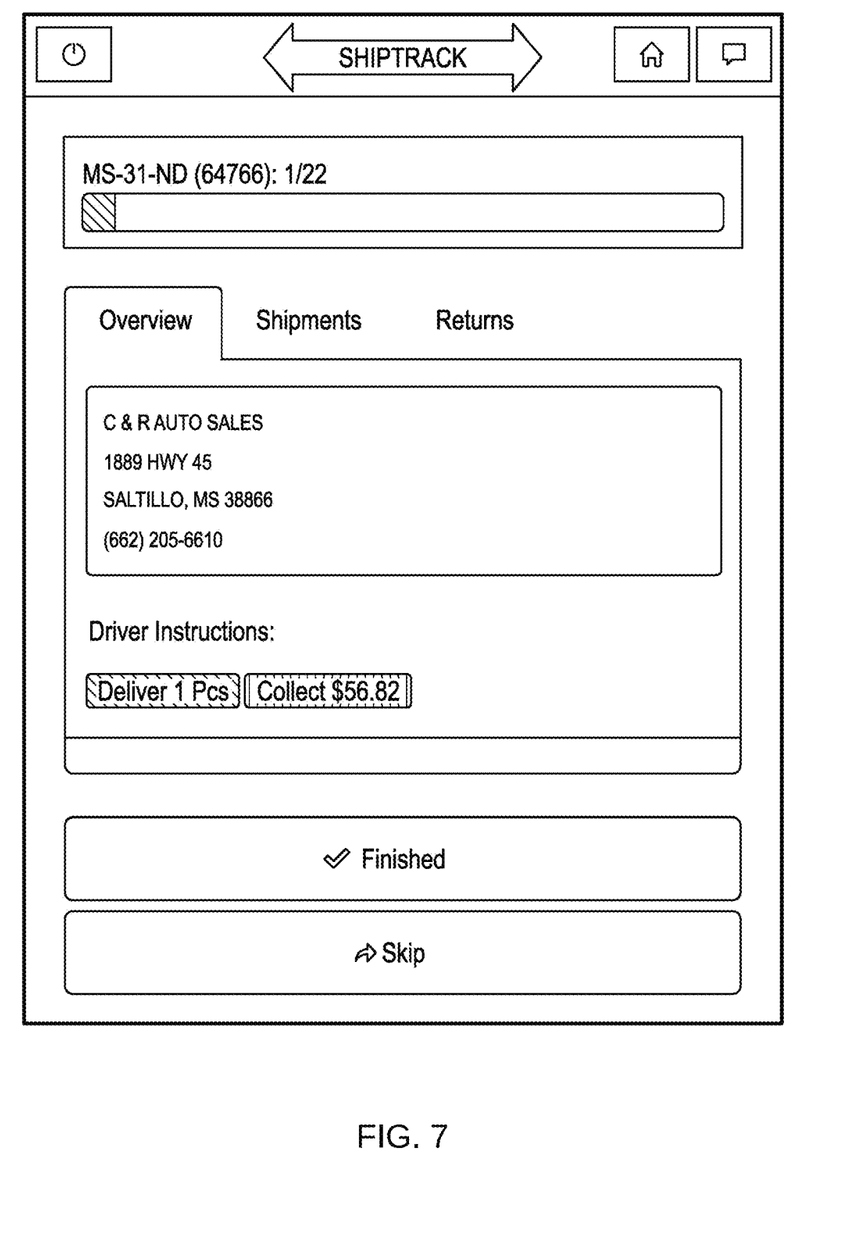
FIG. 7 illustrates an example user interface for dispatchers to view shipments.

Once a manifest has been created the dispatcher can generate a PDF, or other similar version, of the manifest that can be printed and sent with the driver for delivery. This manifest contains all of the delivery information for a specific route and provides fields for the driver to track important information as he completes each stop. In addition to paper manifests, the system also supports a digital delivery application. This feature allows dispatchers to not only remotely assign manifests to drivers from a Manifest Routing interface, but dispatchers can also track the progress and location of each driver in the system. FIG. 7 shows a sample image of a screenshot from the interface.

In a preferred implementation, the mobile driver application is a web-based application that can be accessed from most modern smart phones through a link available for all system instances. This link directs a driver to the system login webpage for the system application where each driver will enter his or her personal credentials to gain access. Once a driver has been authenticated he will be marked as active inside the system. In a preferred embodiment, drivers are authenticated with their own client driver account which includes a driver number and a driver PIN. Subsequently, authenticated drivers will show up on the map as well as the driver list for dispatchers. In a preferred implementation the driver's location is determined by the device's GPS. This also indicates to the dispatchers that the driver is ready to begin receiving manifests.

Figure 8:
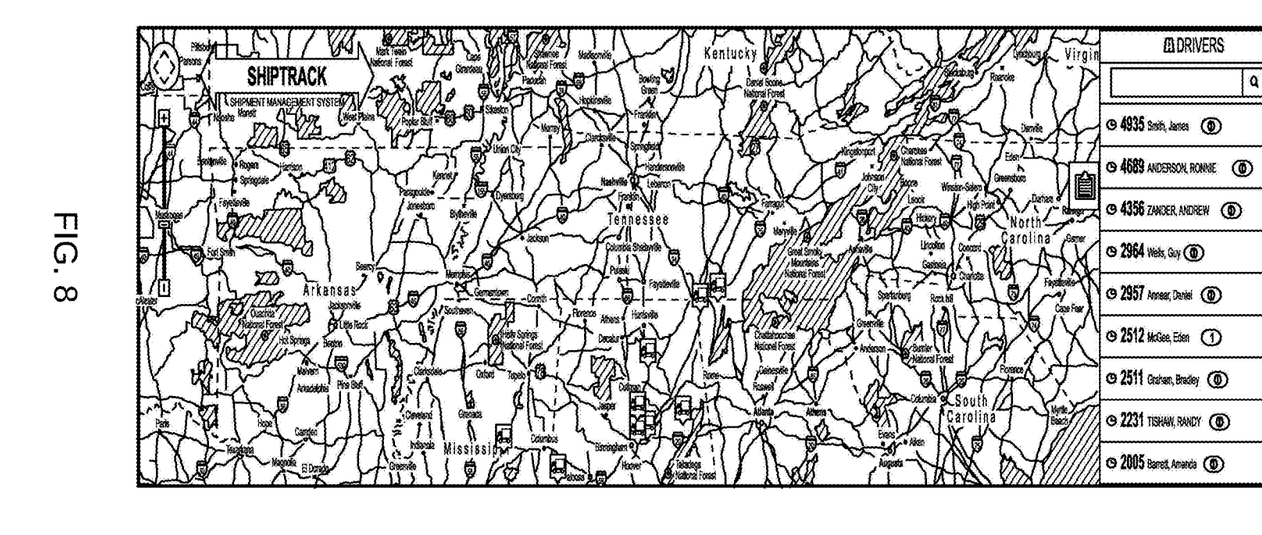
FIG. 8 illustrates an example user interface for a delivery driver's mobile application according to an implementation consistent with the principles of the invention.

Shortly after a manifest has been assigned to a driver the mobile application running on the driver's phone, or similar device, will update and present the driver with the first stop on that manifest. As illustrated in FIG. 8, this screen also provides the driver with the address and other delivery information for that stop, as well as stop specific actions the driver can use to record information for the dispatcher. Said information is accessible from a database via a server.

In one implementation a stop screen provides the driver with two ways to advance to the next stop. First, if a driver completes the stop he can mark it as complete which will update his progress for the dispatcher and move him to the next stop. Second, he can choose to skip the stop which will take him to the next stop in the list, but it will return him to this stop once he has finished all of the other stops on his route. Yet another embodiment of the invention allows the ability for a driver to skip directly to a specific stop.

A preferred implementation of the invention further comprises the mobile driver application facilitating asynchronous communication with dispatchers via a built in text chat system. These messages may be sent to the driver even when he is away from his device and will be received the next time the driver accesses the interface.

In a preferred embodiment, the system sets forth a method for shipping, delivery, returns management, and overall tracking. Generally, in a preferred implementation, a server receives a request from a client device of a user. The request may be for specific information relating to a shipment, delivery, return, or tracking of a shipment, delivery, or return. The server determines the customer account and permission levels for the user requesting information. The server then obtains content from a database based on the user being permitted to access the database content. A server then transmits the content to the client device of said user. Depending on the user's permission level, the user may be able to manipulate the content transmitted from the database. The manipulated data may then be stored on a database.

In a preferred embodiment, customer actions and data are tied to a specific customer such that the actions and data relating to the customer are grouped with that customer, separately from other customers on the system. Each customer has at least one user that is tied to that customer. Users may have certain permission levels that allow the users to access or manipulate certain actions and data relating to the customer to which they are grouped. Generally, a user requests a server via a user interface to access customer actions and data. The server verifies the user's permission level to access said customer actions and data. It is understood that various forms of verification may be used, including login names and passwords, device recognition, or other known authentication means.

The server accesses customer actions and data based on the requesting user's permission level. The server then communicates, based on the received user request, the requested customer actions and data. The server then generates output information that includes the requested customer actions and data. The server then provides the output information to a user interface relating to the user's request and permission levels.

In a preferred implementation, the user permission levels are based on customer and system roles. System roles allow a user to access system wide data. Customer roles allow a user to access information relating solely to the customer to which the user is tied.

In one implementation the system roles have at least one dispatcher permission level that allows a user to access system wide data for all customers. A user with said dispatcher permission level has access to all shipments, deliveries, and returns for all customers in the system. The user with the dispatcher permission level is able to create a joint manifest for a group of customers. The joint manifest is provided to a driver for delivering shipments and accepting returns for a group of customers. A dispatcher may also provide a manifest for one customer, and thus the manifest would not be a joint manifest.

As set forth herein, it is understood that the invention may comprise various customer and system roles. The titles of each customer and system role are not meant to limit the scope of the invention. It is further understood that customized system and customer roles may be created for a specific application and still fall within the scope of this invention. The overall concept is that permission levels may be set to allow only certain users to access and/or manipulate certain data.

In one implementation the manifest being provided to a driver for delivering shipments and accepting returns is on a driver user interface. In a preferred implementation, the driver user interface is accessible to a driver via a mobile application. The mobile application is in communication with the system. The mobile application displays information on the driver user interface based on said driver being authenticated.

A driver may be authenticated based on a driver's specific credentials. It is understood that any method of verifying one's identity and/or credentials may be utilized. In one embodiment, the authenticating credentials may be one of a login name and password, SIMM card authentication, device authentication code, or other similar step of verifying one's identity.

A further implementation comprises the system receiving, by a processing device, customer identification information and user identification information. The processing device further receives transaction type information relating to at least one of: a sale, delivery, return, tracking or an administrative action. The processing device further receives a user request for customer information, the customer information being accessible based on a user's permission level. A processing device receives information related to a user's request based on the user's permission level. The processing device communicates the customer information, limited by the user's permission level. The processing device provides an user interface the requested user information, limited by the user's permission level.

Depending on the user's permission level, the processing device may receive interactive user response information associated with an user interface. The processing device generates a user's input and determines at least one supporting application, or group of applications, to use for processing the user input. The processing device communicates the information to a user interface. The processing device updates the output information for the user interface and provides the updated output information. The updated output information is recorded and stored in the database.

Yet another implementation comprises a processing device receiving customer identification information relating to a specific customer. The customer identification information further comprises users whom are tied with that customer. The processing device further receives user identification information. The user identification information comprises permission levels for the users to access and manipulate certain customer information. The processing device logs into at least one of a group of applications based on a single login and the received user identification information. The processing device receives client identification information. The processing device further receives transaction type information relating to at least one of: a shipment, a return, delivery, tracking, or an administrative action.

The processing device then communicates with at least one of a plurality of applications, based on the received user identification information, the received customer identification information, and the received transaction type information. The processing device then generates integrated output information that includes an output from at least one of a plurality of applications. The processing device then generates customer information associated with the received transaction type information. The processing device then provides an integrated user interface the integrated output information and the requested customer information. The processing device then receives interactive user response information associated with the integrated user interface. The processor then provides, based on the received interactive user response information, at least one supporting application, of the group of applications, to use for processing the action. The processor then communicates with the at least one supporting application. The processing device then updates, based on communicating with the at least one supporting application, the integrated output information for the integrated user interface. The processor then provides for presentation in the integrated user interface the updated integrated output information. The updated integrated output information is used to complete the action.

Yet another implementation of the invention sets forth a method for shipping, delivery, returns, and tracking comprising storing instructions on a memory, and executing those instructions, by at least one processor. The processor executes instructions to receive customer identification information. The processor further receives user identification information. In a preferred implementation the users are tied to a customer. The processor receives transaction type information relating to an action associated with at least one of: a shipment, a return, delivery, tracking, or an administrative action. The processor communicates with at least one of a plurality of applications based on the received user identification information, the received client identification information, and the received transaction type information. The processor generates, based on communicating with at least one of a plurality of applications, requested customer information associated with the received action type information and user request. The processor provides, for presentation, an integrated user interface. The integrated output information and the requested customer information. The processor receives interactive user response information associated with the integrated user interface. The processor provides for presentation in the integrated user interface the information relating to the requested customer. The processor determines, based on the received interactive user response information, at least one supporting application, of the group of applications, to use for processing the action. The processor communicates with the at least one supporting application. The processor updates, based on communicating with the at least one supporting application, the integrated output information for the integrated user interface. The processor provides, for presentation in the integrated user interface, the updated integrated output information being used to complete the transaction.

It will also be apparent to one of ordinary skill in the art that aspects of the invention, as described above, may be implemented in many different forms of software, firmware, and hardware in the implementations illustrated in the figures. The actual software code or specialized control hardware used to implement aspects consistent with the present invention is not limiting of the present invention. Thus, the operation and behavior of the aspects were described without references to the specific software code—it being understood that one of ordinary skill in the art would be able to design software and control hardware to implement the aspects based on the description herein.

The invention claimed is:

1. A method for shipping, delivery, returns and tracking comprising:
   a. Storing customer actions and data in a database;
      i. Said customer actions and data being tied to a specific customer such that said actions and data relating to said customer are grouped with said customer;
      ii. Each customer having an option of having zero or more users tied to said customer;
      iii. Said users having certain permission levels that allow each user to access or manipulate certain actions and data relating to said customer;
   b. Requesting, by a user, a server via a user interface to access customer actions and data;
      i. Said server verifying the user's permission level to access said customer actions and data;
      ii. Said accessed customer actions and data being limited by the permission level of said user;
   c. Receiving, by a server, requested customer actions and data from a database based on a user's request and permission level;
   d. Communicating, by the server, based on the received user request, the requested customer actions and data;
   e. Generating, by the server, output information that includes the requested customer actions and data; and
   f. Providing, by the server to the user, said output information to a user interface relating to the user's request and permission level.

2. The method of claim 1, further comprising, a customer having zero users is only being able to receive shipments and may not perform any other actions required by user permission levels.

3. The method of claim 1, further comprising:
   a. Said user permission level being based on customer and system roles;
   b. Said system roles allowing a user to access system wide data; and
   c. Said customer roles allowing a user to access information relating solely to the customer to which the user is tied.

4. The method of claim 3, further comprising:
   a. Said system roles having at least one dispatcher permission level that allows a user to access system wide data for all customers;
   b. A user with said dispatcher permission level having access to all shipments, deliveries, and returns for all customers in the system;
   c. The user with said dispatcher permission level being able to create a manifest for one or more customers; and
   d. said manifest being provided to a driver for delivering shipments and/or accepting returns for one or more customers.

5. The method of claim 4, further comprising:
   a. the manifest may be created automatically or customized by the user with said dispatcher permission level;
   b. An automatically created manifest being created by compiling all of the outstanding shipments and returns, and grouping items onto the manifest based on customer location, route, and shipment tag;
   c. said grouping being based on geographically relevant areas for delivery or pick-up; and
   d. A customized manifest being created where the user with said dispatcher permission level assigns his own manifest name and selects the individual shipments and returns to include or exclude from the customized manifest.

6. The method of claim 4, further comprising:
   a. Said manifest being provided to a driver for delivering shipments and accepting returns on a driver user interface;
   b. Said driver user interface being accessible to a driver via a mobile application;
   c. Said mobile application being in communication with the database via a server; and
   d. Said mobile application displaying delivery information on the driver user interface.

7. The method of claim 4, further comprising:
   a. Said user with dispatcher permission level navigating, via a web browser, to a dispatcher user interface;
   b. The dispatcher user interface having a map showing, in real time, the location of a driver; and
   c. The location of the driver being determined by a driver GPS device.

8. The method of claim 7, further comprising the map on said dispatcher user interface further displaying, in real time, delivery and pick-up progress.

9. The method of claim 6, further comprising:
   a. said mobile application being in communication with the database via a server;
   b. a dispatcher user interface being in communication with the database via a server;
   c. the dispatcher user interface having a map showing, in real time, the location of a driver; and
   d. a user having permission level to access the dispatcher user interface and a driver accessing a driver user interface being in contact via the server.

10. A method for shipping, delivery, returns, and tracking comprising:
   a. Receiving, by a processing device, customer identification information;
   b. Said customer identification information comprising zero or more users with user identification information;
   c. Receiving, by the processing device, user identification information, if any, relating to said customer;
   d. Receiving, by the processing device, transaction type information relating to at least one of: a sale, delivery, return, tracking or an administrative action;
   e. Receiving, by the processing device and from a user, a user request for customer information, said customer information being accessible based on a user's permission level;
   f. Receiving, by the processing device and from a database, information relating to a user's request based on the user's permission level;
   g. Communicating, by the processing device from a database, said customer information, limited by the user's permission level;
   h. Providing, by the processing device and for presentation to an user interface, the requested user information limited by the user's permission level;
   i. Receiving, by the processing device, interactive user response information associated with an user interface, said interactive user response being limited by the user's permission level;
   j. Generating, by the processing device and based on receiving the interactive user response information, a user's input;
   k. Determining, by the processing device and based on the received interactive user response information, at least one supporting application, or group of applications, to use for processing the user input;
   l. Providing, by the processing device and for presentation in an user interface, the user's input;
   m. Communicating, by the processing device, with the at least one supporting application;
   n. Updating, by the processing device and based on communicating with the at least one supporting application, the output information for the user interface; and
   o. Providing, by the processing device and for presentation in the user interface, the updated output information, the updated output information being recorded and stored in the database.

11. The method of claim 10, further comprising a customer having customer identification information may not have a user with user identification information, and said customer may only be able to receive shipments.

12. The method of claim 10, further comprising:
   a. Said user permission level being based on customer and system roles;
   b. Said system roles allowing a user to access system wide data; and
   c. Said customer roles allowing a user to access information relating solely to the customer to which the user is tied.

13. The method of claim 12, further comprising:
   a. Said system roles having at least one dispatcher permission level that allows a user to access system wide data for all customers;
   b. A user with said dispatcher permission level having access to all shipments, deliveries, and returns for all customers in the system;
   c. The user with said dispatcher permission level being able to create a joint manifest for a group of customers; and
   d. said joint manifest being provided to a driver for delivering shipments and accepting returns for a group of customers.

14. The method of claim 13, further comprising:
   a. the manifest is created automatically or customized by a user having the dispatcher permission level;
   b. An automatically created manifest being created by compiling all of the outstanding shipments and returns, and grouping items onto the manifest based on customer location, route, and shipment tag;
   c. said grouping being based on geographically relevant areas for delivery or pick-up; and
   d. A customized manifest being created where a user having the dispatcher permission level assigns his own manifest name and selects the individual shipments and returns to include or exclude from the customized manifest.

15. The method of claim 13, further comprising:
   a. Said manifest being provided to a driver for delivering shipments and accepting returns on a driver user interface;
   b. Said driver user interface being accessible to a driver via a mobile application;
   c. Said mobile application being in communication with the system; and
   d. Said mobile application displaying information on the driver user interface.

16. The method of claim 13, further comprising:
   a. Said user having the dispatcher permission level navigating, via a web browser, to a dispatcher user interface;
   b. The dispatcher user interface having a map showing, in real time, the location of a driver; and
   c. The location of the driver being determined by a driver GPS device.

17. The method of claim 15, further comprising:
   a. said mobile application being in communication with a server;
   b. the server being in communication with a dispatcher user interface;
   c. the dispatcher user interface having a map showing, in real time, the location of a driver; and
   d. a user having permission level to access the dispatcher user interface and a driver accessing a driver user interface being in contact via the server.

18. A method for shipping, delivery, returns, and tracking comprising:
   a. Receiving, by a processing device, customer identification information;
      i. Said customer identification information comprising information relating to a specific customer;
      ii. Said customer identification information further comprising users whom are tied with said customer;

b. Receiving, by a processing device, user identification information;
   i. Said user identification information being tied to a user of a specific customer;
   ii. Said user identification information comprising permission levels for said user to access and manipulate certain customer information;
c. Logging, by the processing device, into at least one of a group of applications based on a single login and the received user identification information;
d. Receiving, by the processing device, client identification information;
e. Receiving, by the processing device, transaction type information relating to a at least one of: a shipment, a return, delivery, tracking, or an administrative action;
f. Communicating, by the processing device, with at least one of a plurality of applications, based on the received user identification information, the received customer identification information, and the received transaction type information;
g. Generating, by the processing device and based on communicating with at least one of a plurality of applications, integrated output information that includes an output from the at least one of a plurality of applications;
h. Generating by the processing device and based on communicating with the plurality of applications, customer information associated with the received transaction type information;
i. Providing, by the processing device and for presentation to an integrated user interface, the integrated output information and the requested customer information;
j. Receiving, by the processing device, interactive user response information associated with the integrated user interface;
k. Providing, by the processing device and based on the received interactive user response information, at least one supporting application, of the group of applications, to use for processing the action;
l. Communicating, by the processing device, with the at least one supporting application;
m. Updating, by the processing device and based on communicating with the at least one supporting application, the integrated output information for the integrated user interface; and
n. Providing, by the processing device and for presentation in the integrated user interface, the updated integrated output information, the updated integrated output information being used to complete the action.

19. The method of claim 18, further comprising:
a. Said user permission levels being based on customer and system roles;
b. Said system roles allowing a user to access system wide data; and
c. Said customer roles allowing a user to access information relating solely to the customer to which the user is tied.

20. The method of claim 19, further comprising:
a. Said system roles having at least one dispatcher permission level that allows a user to access system wide data for all customers;
b. A user with said dispatcher permission level having access to all shipments, deliveries, and returns for all customers in the system;
c. The user with said dispatcher permission level being able to create a joint manifest for a group of customers; and
d. said joint manifest being provided to a driver for delivering shipments and accepting returns for a group of customers.

21. The method of claim 20, further comprising:
a. Said manifest being provided to a driver for delivering shipments and accepting returns on a driver user interface;
b. Said driver user interface being accessible to driver via a mobile application;
c. Said mobile application being in communication with a server; and
d. Said mobile application displaying information on the driver user interface.

22. The method of claim 21, further comprising:
a. Said user having a dispatcher permission level navigating, via a web browser, to a dispatcher user interface;
b. The dispatcher user interface having a map showing, in real time, the location of a driver;
c. The location of the driver being determined by a driver GPS device.
d. the dispatcher user interface having a map showing, in real time, the location of a driver; and
e. a user having permission level to access the dispatcher user interface and a driver accessing a driver user interface being in contact via the system.

* * * * *